US005272958A

United States Patent [19]

Moinard et al.

[11] Patent Number: 5,272,958

[45] Date of Patent: Dec. 28, 1993

[54] BRAKE BOOSTER WITH COMPRESSION SPRING EXTENSION LIMITING LINKS

[75] Inventors: Patrice Moinard, Montreuil; Philippe Castel, Paris, both of France

[73] Assignee: Bendix Europe Services Techniques, Drancy, France

[21] Appl. No.: 898,645

[22] Filed: Jun. 15, 1992

[30] Foreign Application Priority Data

Jul. 16, 1991 [FR] France ............................... 91 08942

[51] Int. Cl.[5] .......................... F15B 9/10; F01B 29/00

[52] U.S. Cl. ..................................... 91/369.1; 91/374; 92/128; 92/130 R

[58] Field of Search ............... 91/369.1, 369.2, 376 R, 91/368, 374; 92/128, 130 R, 135

[56] References Cited

U.S. PATENT DOCUMENTS 2,308,889 1/1943 McCune ............................ 92/130 R
4,186,650 2/1980 Kytta .
4,354,425 10/1982 Bruton et al. ..................... 92/128 X
4,393,749 7/1983 Miyazaki ........................ 91/369.2 X
4,480,526 11/1984 Carré .
4,630,525 12/1986 Nishii ................................ 91/369.2

FOREIGN PATENT DOCUMENTS 0106723 4/1984 European Pat. Off. .

*Primary Examiner*—Edward K. Look
*Assistant Examiner*—John Ryznic
*Attorney, Agent, or Firm*—Larry J. Palguta; Ken C. Decker

[57] ABSTRACT

The invention relates to a vacuum-operated servo-brake comprising, in a casing consisting of a shell (10) and a cover (12), a piston (20) separating leaktightly two inner chambers (22, 24), a valve means controlled by a rod (32) projecting from the casing in order to ensure the operation of the servo-brake, and a prestressed spring (34) for returning the piston (20) to its rest position substantially abutting the cover (12), the spring (34) bearing on the shell (10). According to the invention, the spring (34) comprises a mechanism enabling its extension to be limited when the shell (10) and the cover (12) are not fixed to each other.

3 Claims, 1 Drawing Sheet

16
14
38
40
32
30
34
42
44
20
36
12
22
10
24
26
46
48

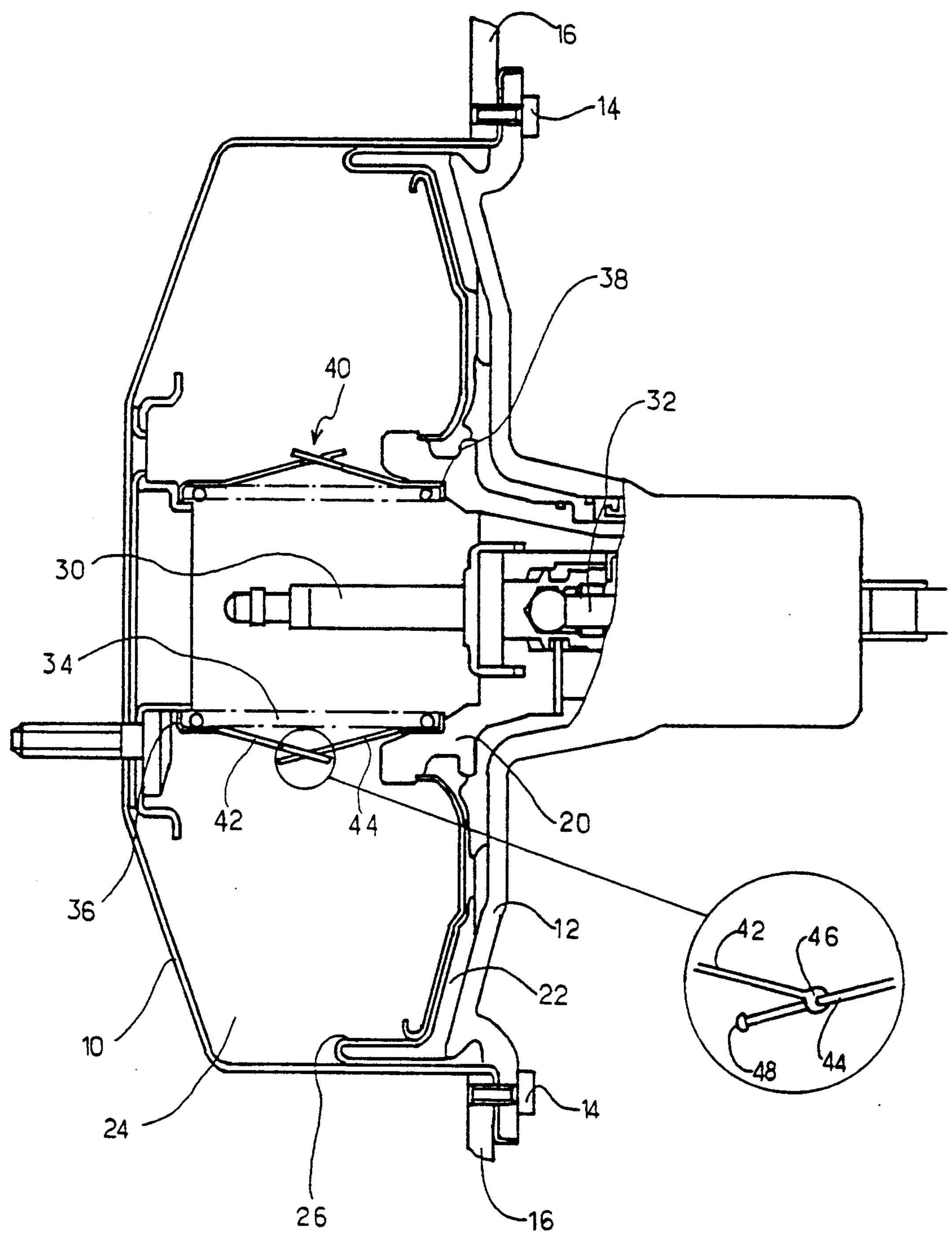
16
14
38
40
32
30
34
42
44
20
36
12
42
46
22
10
48
44
24
14
26
16

BRAKE BOOSTER WITH COMPRESSION SPRING EXTENSION LIMITING LINKS

The present invention relates to vacuum-operated servo-brakes, such as those used for boosting braking on motor vehicles.

Conventionally, these servo-brakes comprise a casing consisting of a shell to which is fixed a master cylinder, and of a cover.

Inside this casing, a piston separates two inner chambers in a leaktight fashion, and a valve means operates the servo-brake.

A prestressed spring for returning the piston to its rest position substantially abutting the cover is arranged between the piston and the shell.

In particular when there is no need for the cover to be crimped to the shell, or alternatively when assembling the components, it is desirable for the spring to be able to remain compressed and not to relax completely. Indeed, this makes it unnecessary to exert an excessively high compressive force on the assembly when fitting the components.

The document US-A-3,137,361 describes a servo-brake of the abovementioned type in which the shell is fixed to the cover by means of bolts so as to be able to be opened when necessary.

However, when opening the casing, or when replacing the cover, the effect of the return spring can pose serious problems.

The object of the present invention is to overcome this disadvantage.

According to the invention, the spring comprises a means enabling its extension to be limited when the shell and the cover are not fixed to each other.

Preferably, this means consists of a collar arranged between the shell and that end of the spring opposite the shell, and of a plurality of links of a specified maximum length connecting the collar to the piston; in a favorable manner, the means comprises a second collar arranged between the piston and that end of the spring opposite the piston, the links connecting the collars to each other.

The invention will now be described by way of example with reference to the accompanying drawings in which the single FIGURE demonstrates diagrammatically in section a servo-brake according to the present invention.

Referring now to this single FIGURE, a servo-brake has been illustrated in which the elements of the casing are not crimped to each other and which can therefore be opened, for example for maintenance.

The casing of the servo-brake therefore comprises, in a conventional manner, a shell 10 and a cover 12 connected to each other by means of a set of bolts 14 which furthermore serves for the fixing of the assembly to the front bulkhead 16 separating the engine compartment of the vehicle from the passenger compartment.

A piston 20 separates the inner volume of the casing into two chambers 22 and 24, a rolling diaphragm 26 ensuring the leaktightness of this separation.

The piston 20 comprises a push-rod 30 capable of actuating a master cylinder (not shown) fixed to the shell 10.

The servo-brake is actuated by a conventional valve means controlled by a rod 32 connected to the brake pedal.

A prestressed spring 34 returns the piston into the rest position, substantially abutting the cover 12. To this end, it is arranged in the chamber 24 between the shell 10 and the piston 20.

A means is provided which enables the extension of the spring 34 to be limited when the shell 10 and the cover 12 are not fixed to each other, in particular during the assembly of the servo-brake or in the event of servicing the servo-brake after it has been fitted on the vehicle.

On the assembly shown, this means consists of a first collar 36 arranged between the shell 10 and that end of the spring 34 opposite the shell, a second collar 38 arranged between the piston 20 and that end of the spring 34 opposite the piston, and a set of links 40 having a specified maximum length connecting the collars 36 and 38 to each other.

These links 40 are preferably articulated so as to move away from the spring 34 when the latter is compressed, in other words not to hinder the operation of the servo-brake and not to limit the travel of the piston 20 when the servo-brake is actuated.

Each link 40 here consists of two strand-parts 42, 44. A first strand-part 42 has one end integral with the first collar 36, and an aperture 46 is made in its other end. The second strand-part 44 has one end integral with the second collar 38 and carries, at its other end, a protuberance 48 of a size greater than that of the aperture 46.

This protuberance 48 and the aperture 46 form a locking element when the second strand-part 44 slides in the aperture 46 of the first strand-part.

In a favorable manner, the collar and associated strand-parts are produced in a single piece.

Numerous modifications and improvements could, of course, be made by a person skilled in the art without going beyond the scope of the invention.

We claim:

1. A vacuum-operated servo-brake comprising, in a casing comprising a shell and a cover, a piston separating leaktightly two inner cambers, valve means controlled by a rod projecting from said casing for operation of said servo-brake, and a prestressed spring for returning said piston to a rest position substantially abutting said cover, said spring bearing on said shell and comprising means for limiting extension of the spring when said shell and cover are not connected with each other, said limiting means comprising a first collar located between said shell and an end of said spring adjacent said shell, and a plurality of links of predetermined maximum length connecting said collar with said piston, said links articulated so as to move away from said spring when the spring is compressed.

2. The vacuum-operated servo-brake according to claim 1, wherein said limiting means comprises a second collar located between said piston and an end of the spring adjacent said piston, said links connecting said collars to one another.

3. The vacuum operated servo-brake according to claim 2, wherein said links each comprise a first strand-part one end of which is fixed to said first collar and a second strand-part one end of which is fixed to one of said piston and said second collar, an aperture located at the other end of one of said first and second strand-parts and the other end of the other of said first and second parts having a protuberance, the other of said first and second strand-parts sliding freely in said aperture until halted by interaction of said protuberance and the other end of the one of said first and second strand-parts.

* * * * *